US012689217B2

(12) United States Patent　　　　　(10) Patent No.:　US 12,689,217 B2
Kolluri et al.　　　　　　　　　　　　(45) Date of Patent:　　　Jul. 21, 2026

(54) CONTROL OF REACTIVE POWER EXPORT AND IMPORT

(71) Applicant: INTERNATIONAL BUSINESS MACHINES CORPORATION, Armonk, NY (US)

(72) Inventors: Ramachandra Rao Kolluri, Cranbourne East (AU); Johannes Adrianus Wilhelmus Röling, Gouda (NL); Glen Garner, Manly West (AU)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 18/379,322

(22) Filed: Oct. 12, 2023

(65) Prior Publication Data

US 2025/0125620 A1　　　Apr. 17, 2025

(51) Int. Cl.
　H02J 3/18　　　　　(2026.01)
(52) U.S. Cl.
　CPC ...................................... H02J 3/18 (2013.01)
(58) Field of Classification Search
　CPC ................................................ H02J 2203/20
　See application file for complete search history.

(56) References Cited

U.S. PATENT DOCUMENTS 4,520,592 A * 6/1985 Holloway ............. E05F 15/624
　　　　　　　　　　　　　　　　　49/358
10,152,683 B2　12/2018　Chen 10,903,652 B2　1/2021　Brissette
2010/0106338 A1　4/2010　Nam
2011/0184579 A1 *　7/2011　Nilsen ........................ H02J 3/14
　　　　　　　　　　　　　　　　307/9.1
2015/0045976 A1 *　2/2015　Li ..................... H02J 13/00026
　　　　　　　　　　　　　　　　700/295

(Continued)

FOREIGN PATENT DOCUMENTS

CN　　113364058 A　　9/2021
KR　20210117839 A　* 9/2021　............. H02J 3/381
WO　2025/078188 A1　4/2025

OTHER PUBLICATIONS

Potter et al., A Reactive Power Market for the Future Grid, retrieved from Internet: arXiv:2110.02337v3 [math.OC] Nov. 10, 2022, Preprint submitted to Elsevier, Nov. 11, 2022, 26 pages.

(Continued)

*Primary Examiner* — Santosh R Poudel
(74) *Attorney, Agent, or Firm* — Harrity & Harrity, LLP

(57)　　　　　　　ABSTRACT

A method, computer program product, and computer system to control an exporting and importing of reactive power by nodes of a network. One node of the network (capable of exporting Q units of reactive power to the network) and N nodes of the network (each capable of importing reactive power from the network) are identified. Initially, Q>0 or Q<0. The N nodes are sorted in ascending order of relative distance between the one node and each of the N nodes. A loop over the sorted N nodes is performed. A next iteration of the loop includes: sending a first and second electromagnetic signal to the first node and a next node, directing the first node and the next node to export an amount Q' of reactive power and to import an amount of reactive power, respectively; and updating Q via Q=Q−Q'.

20 Claims, 8 Drawing Sheets

(56)  References Cited

U.S. PATENT DOCUMENTS

| | | | |
|---|---|---|---|
| 2015/0345951 A1* | 12/2015 | Dutta | ................. G01C 21/3423 |
| | | | 701/400 |
| 2016/0321859 A1* | 11/2016 | Tanner | ................ G07F 17/3267 |
| 2017/0141573 A1* | 5/2017 | Linna | ........................ H02J 3/14 |
| 2019/0148977 A1 | 5/2019 | Kuroda | |
| 2021/0004036 A1 | 1/2021 | Wong | |
| 2021/0319571 A1* | 10/2021 | Oh | .......................... G06T 9/001 |
| 2023/0208147 A1* | 6/2023 | Liu | ........................... H02J 3/48 |
| | | | 307/82 |
| 2024/0083130 A1* | 3/2024 | Mitchell | ................. B30B 9/125 |

OTHER PUBLICATIONS

Gu et al., Cost Sharing Mechanism for Reactive Power Management Amidst P2P Energy Sharing, Authorized licensed use limited to: IBM. Downloaded on Sep. 30, 2023 at 01:36:13 UTC from IEEE Xplore, 5 pages.
Fazeli et al., Distributed-Hierarchical Control Strategy to Coordinate Peer-to-Peer Energy Transactions and Node Voltages at Low Voltage Distribution Networks, IET Smart Grid, eISSN 2515-2947, Received on Dec. 18, 2019, Revised Jun. 17, 2020, Accepted on Jul. 8, 2020, E-First on Nov. 13, 2020, doi: 10.1049/iet-stg.2019.0342 www.ietdl.org, 8 pages.
Zheng et al., Distribution Optimal Power Flow With Energy Sharing via a Peer-to-Peer Transactive Market, frontiers in Energy Research, Original Research published: Jul. 15, 2021, doi: 10.3389/fenrg.2021. 701149, 14 pages.
Almasalma et al., Experimental Validation of Peer-to-Peer Distributed Voltage Control System, Received: Apr. 18, 2018; Accepted: May 16, 2018; Published: May 20, 2018, Energies 2018, 11, 1304; doi:10.3390/en11051304, www.mdpi.com/journal/energies, 22 pages.

Morstyn et al., Integrating P2P Energy Trading With Probabilistic Distribution Locational Marginal Pricing, IEEE Transactions on Smart Grid, vol. 11, No. 4, Jul. 2020, 12 pages.
Zhong et al., Localized reactive power markets using the concept of voltage control areas, IEEE Transactions on Power Systems, vol. 19, No. 3, Aug. 2004, 7 pages.
Jay et al., Locational Marginal Pricing of Reactive Power in Real Time Market Considering Voltage Support Requirement, 978-1-7281-2658-6/19 © 2019 IEEE, Authorized licensed use limited to: IBM. Downloaded on Sep. 30, 2023 at 01:37:20 UTC from IEEE Xplore, 6 pages.
Raap et al., Reactive Power Pricing in Distribution Networks, Oil Shale, 2011, vol. 28, No. 1S, pp. 223-239, ISSN 0208-189X, doi: 10.3176/oil.2011.1S.14, 2011 Estonian Academy Publishers, 17 pages.
Reactive power services, Retrieved from Internet on Oct. 3, 2023: https://www.nationalgrideso.com/industry-information/balancing-services/reactive-power-services, ESO Data Portal, 4 pages.
Wolgast et al., Reactive Power Markets A Review, IEEE Power & Energy Society Section, Received Dec. 14, 2021, accepted Dec. 31, 2021, date of publication Jan. 7, 2022, date of current version Mar. 18, 2022, vol. 10, 2022, 14 pages.
Azim et al., Regulated P2P Energy Trading: A Typical Australian Distribution Network Case Study, Authorized licensed use limited to: IBM. Downloaded on Sep. 30, 2023 at 01:37:46 UTC from IEEE Xplore, 5 pages.
Fazio et al., "Zoning Evaluation for Voltage Control in Smart Distribution Networks", IEEE, 2018, 06 Pages.
International Searching Authority, "Notification of Transmittal of the International Search Report and the Written Opinion of the International Searching Authority, or Declaration," Patent Cooperation Treaty, Jan. 22, 2025, 15 pages, International Application No. PCT/EP2024/077416.
Sreechithra Sumith Madampath et al., "A multi-agent framework for voltage regulation control in distribution systems", IEEE, 2013, 06 Pages.

* cited by examiner

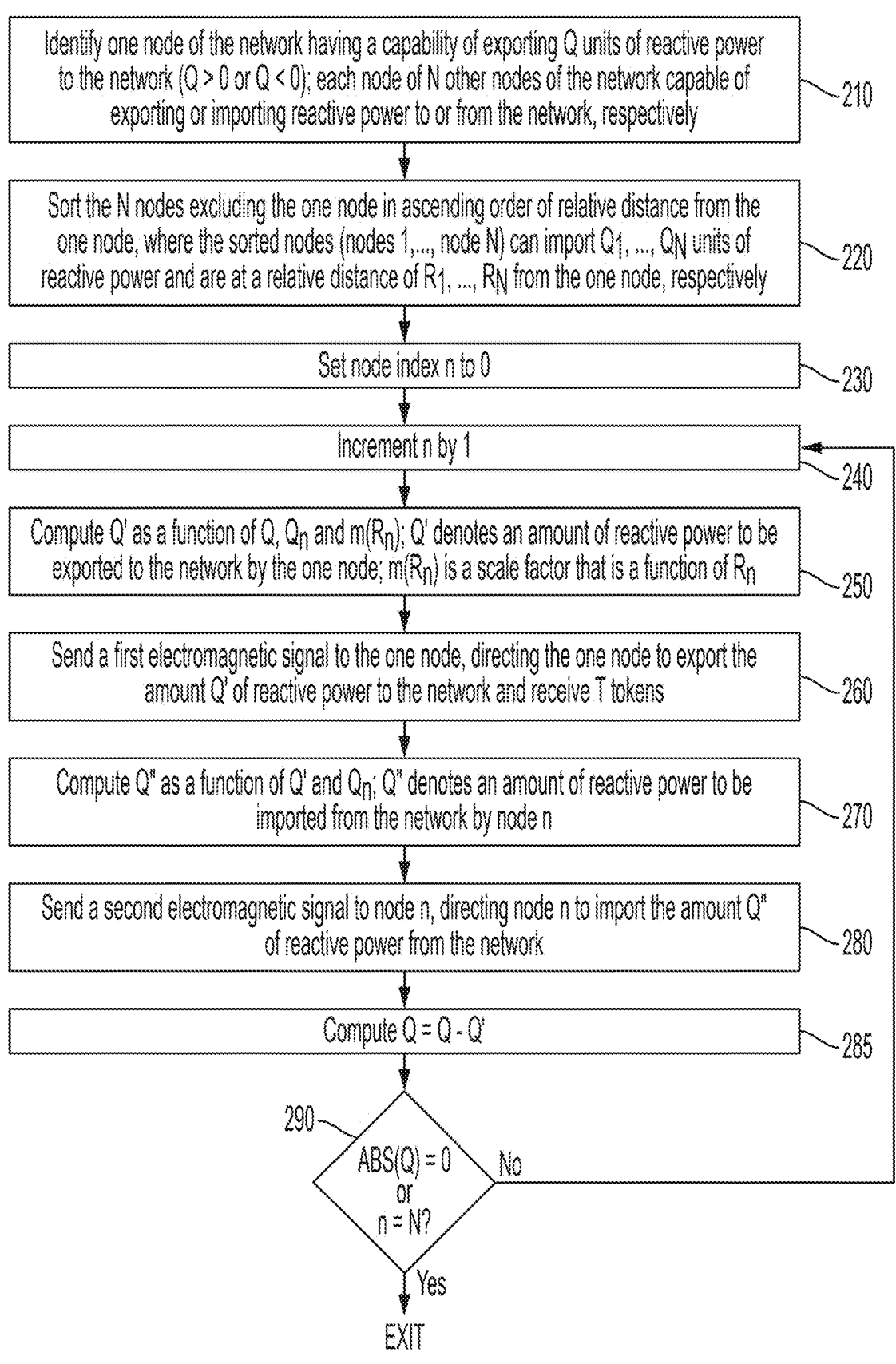

Identify one node of the network having a capability of exporting Q units of reactive power to the network (Q > 0 or Q < 0); each node of N other nodes of the network capable of exporting or importing reactive power to or from the network, respectively — 210

Sort the N nodes excluding the one node in ascending order of relative distance from the one node, where the sorted nodes (nodes 1,..., node N) can import $Q_1$, ..., $Q_N$ units of reactive power and are at a relative distance of $R_1$, ..., $R_N$ from the one node, respectively — 220

Set node index n to 0 — 230

Increment n by 1 — 240

Compute Q' as a function of Q, $Q_n$ and $m(R_n)$; Q' denotes an amount of reactive power to be exported to the network by the one node; $m(R_n)$ is a scale factor that is a function of $R_n$ — 250

Send a first electromagnetic signal to the one node, directing the one node to export the amount Q' of reactive power to the network and receive T tokens — 260

Compute Q" as a function of Q' and $Q_n$; Q" denotes an amount of reactive power to be imported from the network by node n — 270

Send a second electromagnetic signal to node n, directing node n to import the amount Q" of reactive power from the network — 280

Compute Q = Q - Q' — 285

290 — ABS(Q) = 0 or n = N?  No

Yes

EXIT

FIG. 2

CONTROL OF REACTIVE POWER EXPORT AND IMPORT

BACKGROUND

The present invention relates to control of reactive power of an electrical power distribution network, and more specifically, to control of exporting and importing reactive power by nodes of the network.

SUMMARY

Embodiments of the present invention provide a method, a computer program product, and a computer system, for a central controller of an electrical power distribution network to control an exporting and importing of reactive power by nodes of the network.

The central controller identifies one node of the network having a capability of exporting Q units of reactive power to the network and N nodes of the network having a capability of importing reactive power from the network, wherein the N nodes do not comprise the one node, wherein N is at least 2, and wherein initially $Q>0$ or $Q<0$.

The central controller sorts the N nodes in an ascending order of relative distance from the one node, wherein the sorted nodes in ascending order, denoted as nodes $1, \ldots,$ node N, have a capability of importing $Q_1, \ldots, Q_N$ units of reactive power and are at a relative distance of $R_1, \ldots, R_N$ from the one node, respectively.

The central controller sets a node index n to 0.

The central controller performs a loop over the sorted N nodes and a next iteration of the loop includes the following steps.

The central controller increments n by 1.

The central controller computes Q' as a function of Q, $Q_n$ and $m(R_n)$, wherein Q' denotes an amount of reactive power to be exported to the network by the one node, and wherein $m(R_n)$ is a reactive power scale factor that is a function of $R_n$.

The central controller sends a first electromagnetic signal to the one node directing the one node to export the amount Q' of reactive power to the network.

The central controller computes Q" as a function of Q' and $Q_n$, wherein Q" denotes an amount of reactive power to be imported from the network by node n.

The central controller sends a second electromagnetic signal to node n directing node n to import the amount Q" of reactive power from the network.

After the one node has exported the amount Q' of reactive power to the network, the central controller computes $Q=Q-Q'$ followed by: if $ABS(Q)=0$ or $n=N$ then the loop is exited, otherwise the central controller branches to the incrementing of n by 1 to perform a next iteration of the loop.

BRIEF DESCRIPTION OF THE DRAWINGS

FIG. 2 is a flow chart describing a method for a central controller of an electrical power distribution network to control an exporting and importing of reactive power by nodes of the network, in accordance with embodiments of the present invention.

DETAILED DESCRIPTION

Figure 1:
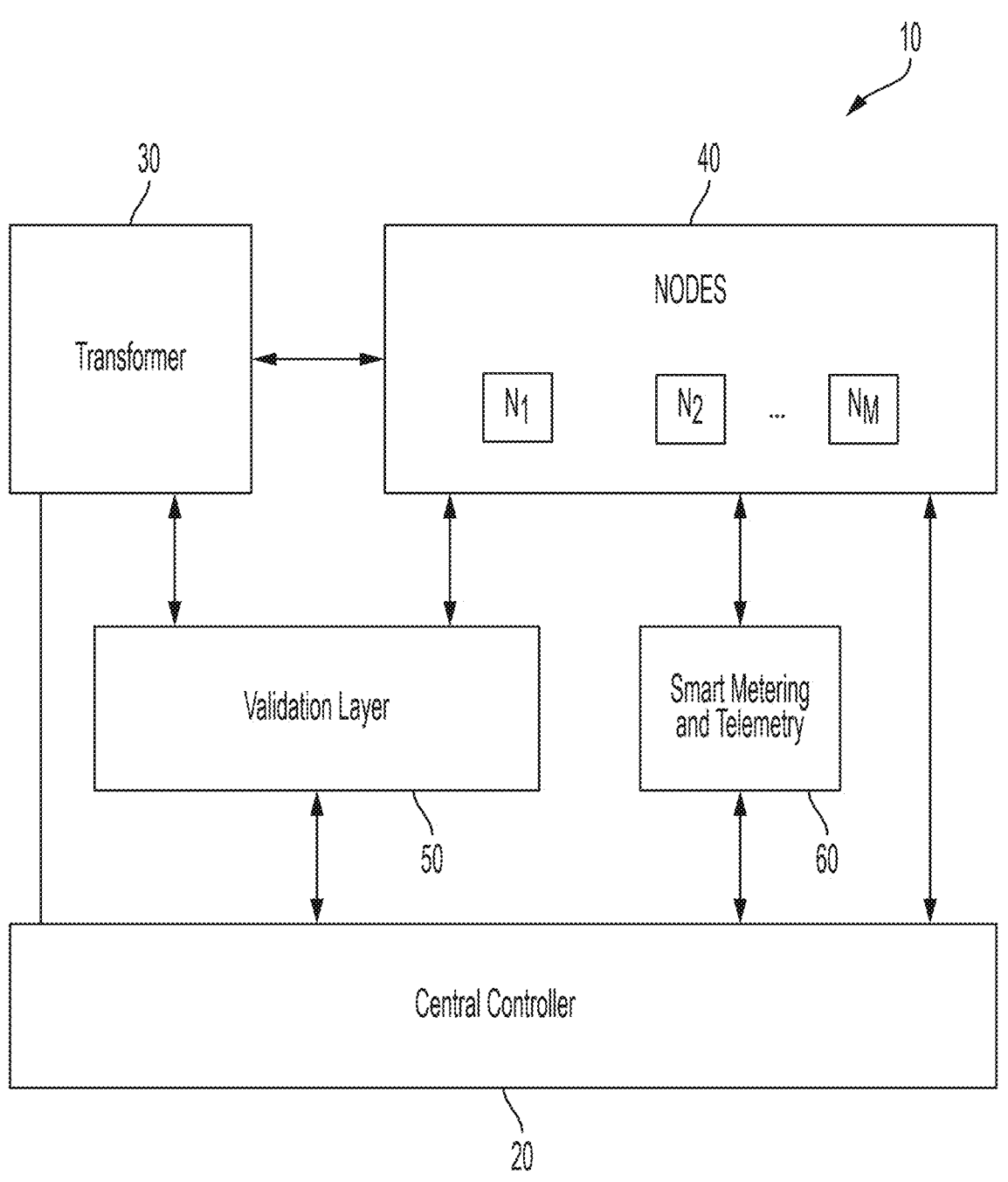
FIG. 1 depicts an architecture of an electrical power distribution network, in accordance with embodiments of the present invention.

According to an aspect of the invention in which a central controller of an electrical power distribution network controls an exporting and importing of reactive power by nodes of the network, the central controller identifies one node of the network having a capability of exporting Q units of reactive power to the network and N nodes of the network having a capability of importing reactive power from the network, wherein the N nodes do not comprise the one node, wherein N is at least 2, and wherein initially $Q>0$ or $Q<0$. The central controller sorts the N nodes in an ascending order of relative distance from the one node, wherein the sorted nodes in ascending order, denoted as nodes $1, \ldots,$ node N, have a capability of importing $Q_1, \ldots, Q_N$ units of reactive power and are at a relative distance of $R_1, \ldots, R_N$ from the one node, respectively. The central controller sets a node index n to 0. The central controller performs a loop over the sorted N nodes and a next iteration of the loop includes the following steps.

The central controller increments n by 1. The central controller computes Q' as a function of Q, $Q_n$ and $m(R_n)$, wherein Q' denotes an amount of reactive power to be exported to the network by the one node, and wherein $m(R_n)$ is a reactive power scale factor that is a function of $R_n$. The central controller sends a first electromagnetic signal to the one node directing the one node to export the amount Q' of reactive power to the network. The central controller computes Q" as a function of Q' and $Q_n$, wherein Q" denotes an amount of reactive power to be imported from the network by node n. The central controller sends a second electromagnetic signal to node n directing node n to import the amount Q" of reactive power from the network. After the one node has exported the amount Q' of reactive power to the network, the central controller computes $Q=Q-Q'$ followed by: if $ABS(Q)=0$ or $n=N$ then the loop is exited, otherwise the central controller branches to the incrementing of n by 1 to perform a next iteration of the loop. The preceding aspect of the invention advantageously avoids having too much reactive power, or not enough reactive power, which regulates voltage levels within the electrical power distribution network and controls the voltage profile while maintaining the voltage within acceptable limits, by carefully controlling the injection or absorption of reactive power to balance the reactive power demand of different loads, which optimizes the network's performance and reducing losses.

In embodiments, (i) computing Q' comprises: computing $P_n = Q_n*(1+m(R_n))$; and if $ABS(Q)-ABS(P_n)>0$ then computing $Q'=P_n$, otherwise computing Q'=Q and (ii) computing Q" comprises: if $ABS(Q')-ABS(Q_n)>0$ then computing $Q"=Q_n$, otherwise computing Q"=Q. The preceding embodiments advantageously compute an amount of reactive power to export or import in a manner that ensures that reactive power exchange between the first node and the N nodes will be preferential for nodes nearer to the first node than for nodes relatively more distant from the first node, which minimizes transport of reactive power over large distances. A transport of reactive power over long distances can result in increased losses in the transmission lines which can lead to a decrease in the overall efficiency of the electrical power system.

In embodiments, initially Q>0 or Q<0 which are mitigated by the one node exporting or importing reactive power, respectively, and avoids adverse effects of having too much reactive power and/or not enough reactive power.

Adverse effects of too much reactive power include, inter alia: (i) voltage levels reduction leading to voltage instability which can result in equipment malfunction, reduced efficiency, and power outages; (ii) increased line losses in the electrical power distribution network, resulting in reduction of the efficiency of the power system; (iii) overheating of electrical equipment (e.g., transformers, motors, generators, etc.) causing increased wear and tear and consequent reduction in useful lifespan of the electrical equipment; and (iv) inefficient energy usage due to participation of reactive power in the transmission and distribution of power without providing any useful output.

Adverse effects of not enough reactive power include, inter alia: (i) insufficient voltage leading to dimming lights, decreased efficiency in motors and other equipment, and potential malfunctions; (ii) voltage collapse that can result in blackouts; (iii) drawing more electrical current than necessary to perform a given amount of useful work, leading to damage of the electrical equipment; (iv) reduction in power transmission efficiency due to insufficient reactor power required to establish the electromagnetic fields in transmission lines that enable the efficient transfer of active power (i.e., real power) over long distances; (v) and congestion in the power grid due to reduction in the amount of power being transmitted through power lines to avoid equipment damage or system instability.

The global electricity network is designed to transfer energy to any end-user requirements at best quality and efficiency. The energy transfer can comprise multiple energy components collectively known as apparent energy. By design, in an electrical power distribution network using alternating current (AC), the apparent power (which is aggregated with time to form energy) has two components: (i) active power (P) (also called real power) measured in kW and associated energy is measured in kWh; and (ii) reactive power (Q) measured in kVAr and associated energy measured in kVArh.

Although real power is the most desirable component for energy transfer, such electrical power distribution networks have both real and reactive (circulating) components as a result of the power flow equations. Specifically in such electrical power distribution networks, the real power (P) and reactive power (Q) have a cumulative effect on system voltage. When network resistance dominates (i.e., significantly exceeds) the reactance, real power has a better control over voltage regulation while reactive power injection/absorption can only have a positive/negative incremental effect. However, the power factor (PF), which is defined as the ratio of the active power to apparent power, is reduced due to increased apparent power resulting from higher circulating currents (as reactive power). The reduced power factor can have a detrimental effect on efficiency, life of distribution transformers and PF-dependent devices.

The reactive power in an alternating current (AC) electrical power distribution network results from the current waveform being out of phase with the voltage waveform and is due reactive loads (i.e., capacitative or inductive loads) in the AC electrical power distribution network. If the load is purely reactive (i.e., if the AC circuit has no electrical resistive elements), then the voltage and current waveforms are out of phase by 90 degrees.

The formula for reactive power (Q) is $Q=V\times I\times\sin(q)$, where V is the voltage magnitude, I is the current magnitude, and $\varphi$ is the phase angle between the current and voltage waveforms. Reactive power may be expressed in a unit called volt-amperes reactive (VAr) or kVAr.

Reactive power helps to regulate voltage levels within an electrical power distribution network. Reactive power flows are responsible for controlling the voltage profile and maintaining the voltage within acceptable limits.

Reactive power corrects the power factor for efficient energy usage. A low power factor indicates an inefficient use of electrical power and can result in increased energy consumption, higher losses, and decreased system capacity.

Reactive power balances loads and optimizes performance of an electrical power distribution network. Careful control of the injection or absorption of reactive power can balance the reactive power demand of different loads, thereby optimizing the network's performance and reducing losses.

Reactive power compensates for voltage drops in transmission. Injection of reactive power at specific points in the network can mitigate voltage drop effects, ensuring a stable and adequate supply of electricity.

Reactive power injection helps counteract the effects of reactive power demands from loads and reactive power losses in transmission and distribution lines.

Although reactive power is a component of electrical power that does not perform useful work, such as producing mechanical or electrical output, reactive power is necessary for the functioning of alternating current (AC) power systems by facilitating the transfer of active power (i.e., real power) over long distances and is necessary for supporting voltage levels. However too much reactive power, or not enough reactive power, can have adverse effects.

Adverse effects of too much reactive power include, inter alia: (i) voltage levels reduction leading to voltage instability which can result in equipment malfunction, reduced efficiency, and power outages; (ii) increased line losses in the electrical power distribution network, resulting in reduction of the efficiency of the power system; (iii) overheating of electrical equipment (e.g., transformers, motors, generators, etc.) causing increased wear and tear and consequent reduction in useful lifespan of the electrical equipment; and (iv) inefficient energy usage due to participation of reactive power in the transmission and distribution of power without providing any useful output.

Adverse effects of not enough reactive power include, inter alia: (i) insufficient voltage leading to dimming lights, decreased efficiency in motors and other equipment, and potential malfunctions; (ii) voltage collapse that can result in blackouts; (iii) drawing more electrical current than necessary to perform a given amount of useful work, leading to damage of the electrical equipment; (iv) reduction in power transmission efficiency due to insufficient reactor power required to establish the electromagnetic fields in transmission lines that enable the efficient transfer of active power (i.e., real power) over long distances; (v) and congestion in the power grid due to reduction in the amount of power being transmitted through power lines to avoid equipment damage or system instability.

To mitigate nodes of an electrical power distribution network having too much or not enough reactive power, embodiments of the present invention trigger selective exporting and importing of reactive power by nodes of the electrical power distribution network. Specifically, embodiments of the present invention use a central controller, which is aware of reactive power requirements and capabilities to facilitate reactive power transfer within an electrical power distribution network, to facilitate export or import of reactive power between nodes of the network and the network itself in consideration of relative distance between the nodes.

FIG. 1 depicts an architecture of an electrical power distribution network 10, in accordance with embodiments of the present invention.

The electrical power distribution network 10 includes: a central controller 20, a transformer 30, nodes 40 including N nodes $N_1, N_2 \ldots, N_M$ where M is at least 3, a validation layer 50, and smart metering and telemetry 60.

The controller 20 is in bidirectional communication with the transformer 30, each node of nodes 40, the validation layer 50, and the smart metering and telemetry 60.

The transformer 30 is in bidirectional communication with the central controller 20, each node of nodes 40, and the validation layer 50.

Each node of nodes 40 is in bidirectional communication with the central controller 20, the transformer 30, the validation layer 50, and smart metering and telemetry 60.

The validation layer 50 is in bidirectional communication with the central controller 20, the transformer 30, each node of nodes 40, and smart metering and telemetry 60.

Smart metering and telemetry 60 is in bidirectional communication with the central controller 20, each node of nodes 40, and the validation layer 50.

Each node of nodes 40 receives and uses electrical power at a location that is specific to each node.

Each node of nodes 40 receives real power from the transformer 20 and also uses reactive power due to reactive loads (i.e., capacitive or inductive loads) as discussed supra. At any point in time, each node may have a capability of exporting or importing reactive power to or from the electrical power distribution network, respectively.

Each node of nodes 40 can be only an exporter or an importer of reactive power, but cannot be both an exporter and an importer of reactive power during a given time period.

Each node of nodes 40 publishes the node's export or import capability periodically between predesignated timestamps (e.g., between 10:30 am and 11:00 am each day), which is accessed and utilized by the central controller 20.

Each node of nodes 40 includes a computing device that includes a computer processor.

All nodes of nodes 40 are on the same phase.

The central controller 20 includes a computing device that includes a computer processor. The central controller 20 controls distribution of reactive power within the electrical power distribution network 10, using the computing device within the central controller 20.

In one embodiment, the central controller 20 is a node of the electrical power distribution network 10 and includes the functionality of a node of nodes 40 in addition to controlling distribution of reactive power within the electrical power distribution network 10.

In one embodiment, the central controller 20 controls distribution of reactive power within the electrical power distribution network 10, but the central controller 20 does not include the functionality of a node of nodes 40.

The transformer 20 is configured to facilitate transmission of real power from power generation sources to each node of nodes 40. The transformer 20 is also configured to facilitate transmission of reactive power to and from each node of nodes 40 if such transmission of reactive power is not adequately controlled by the central controller 20.

The smart metering and telemetry 60 records energy and power usage of each node of nodes 40. Each node of nodes 40 is connected to both the smart metering and telemetry 60 and the validation layer 50. By communicating with the smart metering and telemetry 60, the validation layer 50 corresponds to a connected network of a smart meters or any such validated metering device that is capable of recording energy input/output, power quality (voltage) at high frequency and precision.

The direction of reactor power (q) flow depends on whether $q>0$ or $q<0$ in accordance with the following definitions.

If a node of the network exports an amount q of reactive power to the network where $q>0$, then the node physically exports the amount q of reactive power to the network. For example, if a node of the network exports an amount 100 VAr of reactive power to the network, then the node physically exports the amount 100 VAr of reactive power to the network.

If a node of the network exports an amount q of reactive power to the network where $q<0$, then the node physically imports an amount-q of reactive power from the network. For example, if a node of the network exports −100 VAr of reactive power to the network, then the node physically imports 100 VAr of reactive power from the network.

If a node of the network imports an amount q of reactive power from the network where $q>0$, then the node physically imports the amount q of reactive power from the network. For example, if a node of the network imports 100 VAr of reactive power from the network, then the node physically imports 100 VAr of reactive power from the network.

If a node of the network imports an amount q of reactive power from the network where $q<0$, then the node physically exports the amount-q of reactive power to the network. For example, if a node of the network imports −100 VAr of reactive power from the network, then the node physically exports 100 VAr of reactive power to the network.

FIG. 2 is a flow chart describing a method for a central controller of an electrical power distribution network (hereinafter, "network") to control an exporting and importing of reactive power by nodes of the network, in accordance with embodiments of the present invention. The method of FIG. 2 includes steps 210-290.

In step 210, the central controller 20 identifies one node of the network having a capability of exporting an amount Q of reactive power to the network and N nodes of the network each having a capability of importing reactive power r from the network. The N nodes of the network do not comprise the one node. Nis at least 2. Initially, $Q>0$ or $Q<0$.

As explained supra, the embodiment of $Q>0$ is configured for physical export of the amount Q of reactive power to the network by the one node, and the embodiment of Q<0 is configured for physical import of an amount-Q of reactive power from the network by the one node. If Q<0 then-Q>0.

In step 220, the central controller 20 sorts the N nodes in an ascending order of relative distance $R_n$ (n=1, . . . , N) from the one node. The sorted nodes in ascending order, denoted as nodes 1, . . . , node N, have a capability of importing amounts $Q_1$, . . . , $Q_N$ of reactive power and are at a relative distance of $R_1$, . . . , $R_N$ from the one node, respectively.

In step 230, the central controller 20 sets a node index n to 0.

Steps 240-290 perform a loop of iterations over the sorted N nodes.

In step 240, the central controller 20 increments n by 1. Thus, n denotes both node n and iteration n of the loop.

Figure 3:
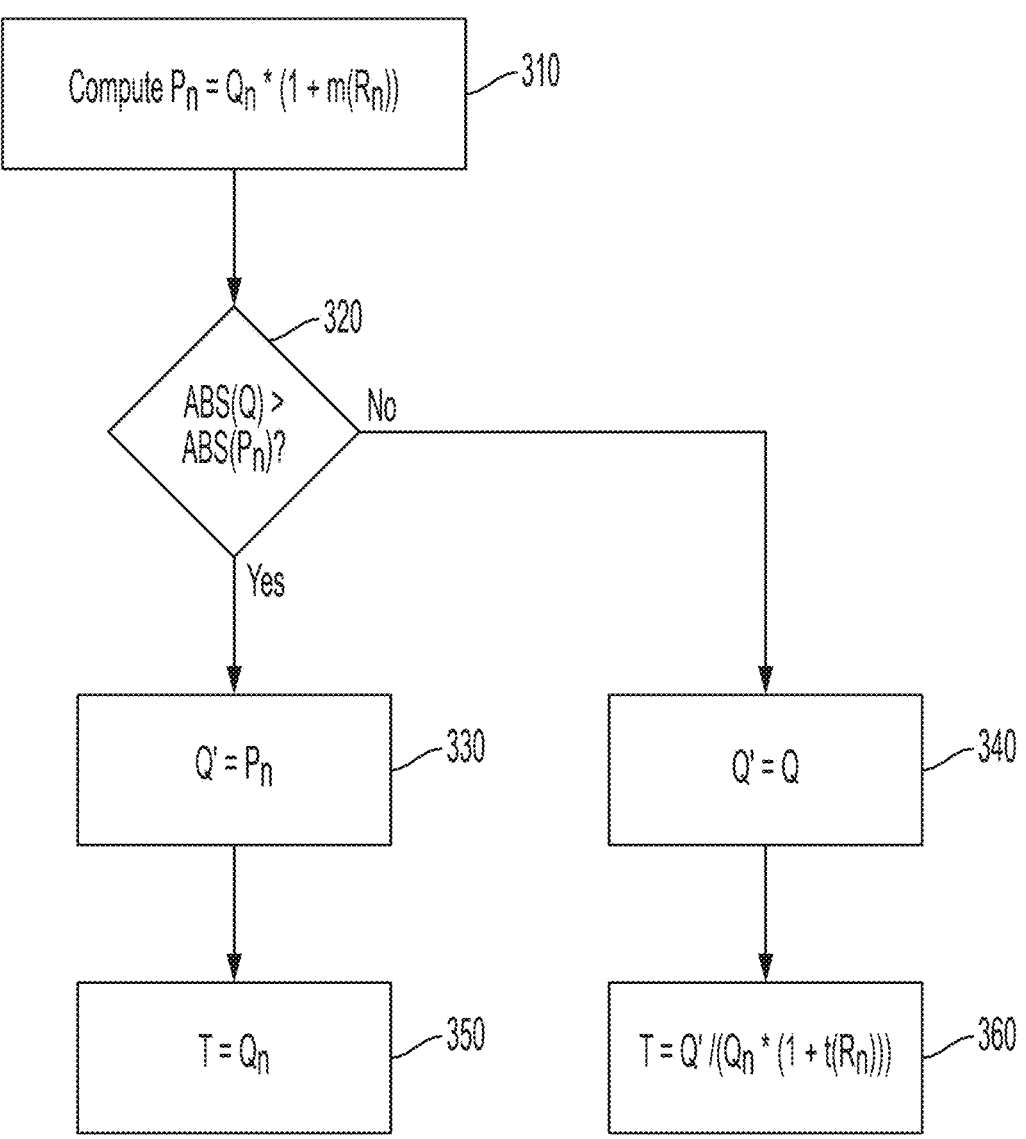
FIG. 3 is a flow chart describing embodiments for computing an amount of reactive power to be exported to the network by one node of the electrical power distribution network, in accordance with embodiments of the present invention.
Figure 5:
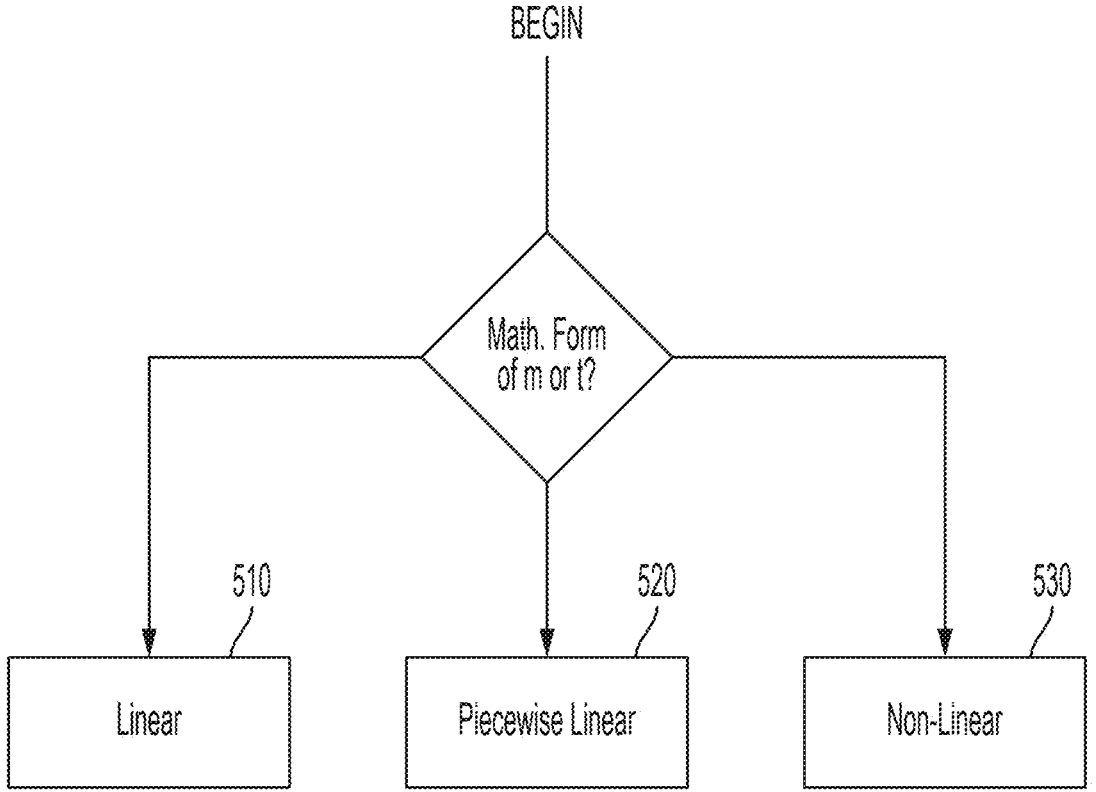
FIG. 5 depicts permissible mathematical forms of a scale factor, in accordance with embodiments of the present invention.
Figure 6:
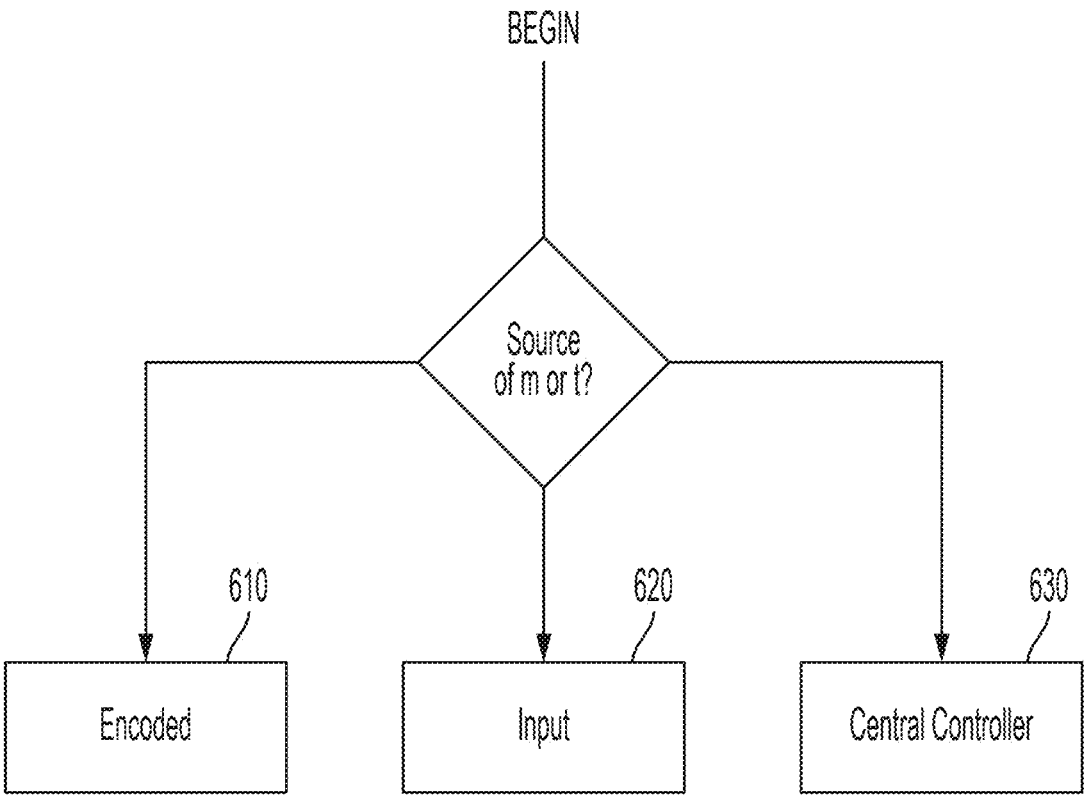
FIG. 6 depicts permissible sources of the scale factor, in accordance with embodiments of the present invention.

In step 250, the central controller 20 computes Q' as a function of Q, $Q_n$ and m($R_n$), wherein Q' denotes an amount of reactive power to be exported to the network by the one node, and wherein m($R_n$) is a reactive power scale factor that is a function of $R_n$. FIG. 3, described infra, presents embodiments for computing Q' as a function of Q, $Q_n$ and m($R_n$). FIGS. 5 and 6, described infra, presents embodiments for determining m($R_n$).

In step 260, the central controller 20 sends a first electromagnetic signal to the one node directing the one node to export the amount Q' of reactive power to the network.

Figure 4:
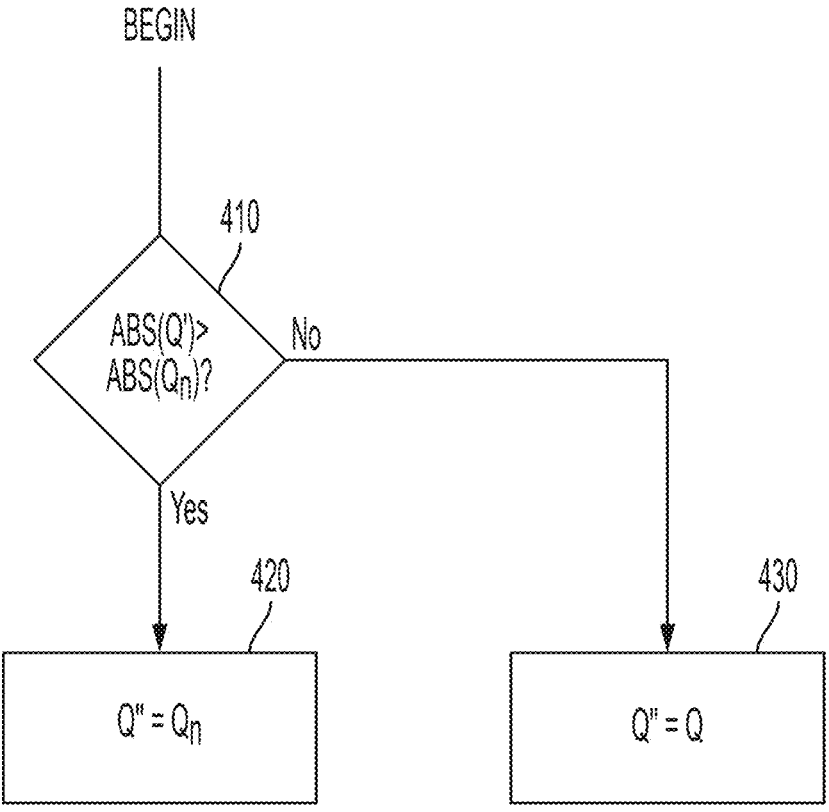
FIG. 4 is a flow chart describing embodiments for computing an amount of reactive power to be imported from the network by a node of the electrical power distribution network, in accordance with embodiments of the present invention.

In step 270, the central controller 20 computes Q" as a function of Q' and $Q_n$, wherein Q" denotes an amount of reactive power to be imported from the network by node n. FIG. 4, described infra, presents embodiments for computing Q" as a function of Q' and $Q_n$.

In step 280, the central controller 20 sends a second electromagnetic signal to node n directing node n to import the amount Q" of reactive power from the network.

In step 285, the central controller computes Q=Q–Q' which updates Q.

In step 290, the central controller 20 determines whether ABS(Q)=0 or n=N, and if so (Yes) then the method exits, and if not (No) then the method loops back to step 240 to perform the next iteration (n+1) of the loop.

FIG. 3 is a flow chart describing embodiments for computing an amount of reactive power (Q') to be exported to the network by the one node, in accordance with embodiments of the present invention. The flow chart of FIG. 3 implements step 250 of FIG. 2 and includes steps 310-360

In step 310, the central controller 20 computes $P_n$ in accordance with Equation (1).

$$P_n = Q_n * (1 + m(R_n))$$ (1)

In step 320, the central controller 20 determines whether ABS(Q)>ABS($P_n$) wherein ABS denotes absolute value, and if so (Yes) then the central controller 20 computes Q'=$P_n$ in step 330 followed in one embodiment by execution of step 350, and if not (No) then the central controller 20 computes Q'=Q in step 340 followed in the one embodiment by execution of step 360.

Steps 350 and 360 are performed for an embodiment in which T is computed, wherein T denotes a number of tokens that can be subsequently exchanged with the network 10 for real or reactive power. Step 350 is executed after step 330 is executed. Step 360 is executed after step 340 is executed.

In step 350, the central controller 20 computes T=$Q_n$.

In step 360, the central controller 20 computes T in accordance with Equation (2).

$$T = Q'/(Q_n * (1 + t(R_n)))$$ (2)

It is noted that t ($R_n$) is a token scale factor that is a function of $R_n$. FIGS. 5 and 6, described infra, presents embodiments for determining t ($R_n$).

FIG. 4 is a flow chart describing embodiments for computing an amount of reactive power (Q") to be imported from the network by node n, in accordance with embodiments of the present invention. The flow chart of FIG. 4 implements step 270 of FIG. 2 and includes steps 410-430.

In step 410, the central controller 20 determines whether ABS(Q')>ABS($Q_n$), and if so (Yes) then the central controller 20 computes Q"-$Q_n$ in step 420, and if not (No) then the central controller 20 computes Q"=Q in step 430.

FIG. 5 depicts permissible mathematical forms of a scale factor s($R_n$), in accordance with embodiments of the present invention.

The scale factor s($R_n$) denotes either the reactive power scale factor m($R_n$) appearing in Equation (1) or the token scale factor t ($R_n$) appearing in Equation (2).

In one embodiment, t ($R_n$)=m($R_n$).

In one embodiment, t ($R_n$) #m($R_n$).

FIG. 5 shows that s($R_n$) may be a linear function 510 of $R_n$, a piecewise linear function 520 of $R_n$, or a non-linear function 530 of $R_n$.

An example of s($R_n$) being a linear function of $R_n$, is: s($R_n$)=0.05+0.10*$R_n$.

An example of s($R_n$) being a piecewise linear function of $R_n$, is: s($R_n$)=0.10*$R_n$ if $R_n$≤3.0 and s($R_n$)=0.20*$R_n$ if $R_n$>3.0. The piecewise linear function is assumed to include at least two pieces having different slopes.

An example of s($R_n$) being a non-linear function of $R_n$, is: s($R_n$)=0.10*$(R_n)^2$.

It is noted that a piecewise linear function of $R_n$ and a non-linear function of $R_n$ are not mutually exclusive, because a piecewise linear function of $R_n$ is non-linear.

FIG. 6 depicts permissible sources of the scale factor s($R_n$), in accordance with embodiments of the present invention.

FIG. 6 shows an embodiment 610 in which s($R_n$) may be encoded in software used by the central controller 20 to implement the method of FIGS. 2-4.

FIG. 6 shows an embodiment 620 in which s($R_n$) may be accessed by the central controller 20 as input to the method of FIGS. 2-4. In one embodiment, the input may be provided by a user via a keyboard, a mouse, etc. In one embodiment, the input may be accessed from data storage in a computer-readable storage device.

FIG. 6 shows an embodiment 630 in which s($R_n$) may be determined by the central controller 20. In one embodiment, the central controller 20 determines a same s($R_n$) for all iterations n of the method of FIGS. 2-4. In one embodiment, the central controller 20 determines s($R_n$) specific to each iteration n in the method of FIGS. 2-4.

In embodiments of the present invention, all reactive power transfers are within a Dynamic Operating Envelope (DOE). The DOE defines a safe and effective range of reactive power operation in order to ensure reliable and stable operation of an electrical grid.

The DOE may be determined by, inter alia, one or more of: power system operators responsible for managing and controlling the operation of the power grid, government agencies or regulatory bodies that set standards and regulations regarding the provision and control of reactive power in the power system, electric utilities and generation companies, grid equipment manufacturers, etc.

When the reactive power transfer is carried out well within the DOE limits, the selection of $m(R_n)$ is quite flexible. In one embodiment, the selection of $m(R_n)$ can be based upon a historical understanding of the electrical power distribution network 10 and DOEs. Selection of $m(R_n)$ is increasingly more flexible as the average DOE band becomes wider, but becomes more restricted when DOE bands are smaller. Hence a larger $m(R_n)$ or a piecewise $(R_n)$ may be selected to restrict long distance energy transfer. Selection of $m(R_n)$ should be configured in such a way that will make nodes avoid disproportionate export or import of reactive power, usually caused by a large $m(R_n)$ or a large relative distance $R_n$.

When the reactive power transfer is carried out near the DOE limits (i.e., within a specified tolerance below the DOE limit), the $m(R_n)$ selection must ensure that the lowest DOE reactive power limit (for any iteration n) is not violated after the reactive power transfer of $Q'=Q_n*(1+m(R_n))$ (step 330 of FIG. 3). In one embodiment, the central controller 20 has the flexibility to downgrade Q' or reject the reactive power transfer of Q' violating the DOE limits or to select $m(R_n)$ to avoid any DOE violation.

The sorting of the N nodes in step 220 of FIG. 2, in combination with a selection of $m(R_n)$ that is a monotonically increasing function of the distance $R_n$ of node n from the first node, ensures that reactive power exchange between the first node and the N nodes will be preferential for nodes nearer to the first node than for nodes relatively more distant from the first node.

In one embodiment, the selection of t $(R_n)$ is configured to be a monotonically decreasing function of $R_n$, so t $(R_n)$ for a nearest neighbor node is higher than for a more distant node from the one node.

Tables 1-4 infra present Examples 1-4, respectively, illustrating the method of FIGS. 2-4 in different scenarios. In Tables 1-4, all reactive power values are in units of VAr, nodes 1-3 have been sorted in ascending order of $R_n$ in accordance with step 220 of FIG. 2, and the index n denotes both iteration n and node n. Each node publishes the node's export or import capability between predesignated timestamps (e.g., between 10:30 am and 11:00 am), which is accessed and utilized by the central controller 20.

In Table 1, the one node has a surplus export reactive power capability relative to the import reactive power capability of nodes 1-3 collectively (i.e., Q>0 initially and $$\mathrm{ABS}(Q) > \mathrm{ABS}\left(\Sigma_1^3 Q_n\right)$$

initially).

In Table 2, the one node has a limited export reactive power capability relative to the import reactive power capability of nodes 1-3 collectively (i.e., Q>0 initially and $$\mathrm{ABS}(Q) < \mathrm{ABS}\left(\Sigma_1^3 Q_n\right)$$

initially).

In Table 3, the one node has a surplus import reactive power capability relative to the export reactive power capability of nodes 1-3 collectively (i.e., Q<0 initially and $$\mathrm{ABS}(Q) > \mathrm{ABS}\left(\Sigma_1^3 Q_n\right)$$

initially).

In Table 4, the one node has a limited import reactive power capability relative to the export reactive power capability of nodes 1-3 collectively (i.e., Q<0 initially and $$\mathrm{ABS}(Q) < \mathrm{ABS}\left(\Sigma_1^3 Q_n\right)$$

initially).

TABLE 1

$Q > 0$ initially; $\mathrm{ABS}(Q) > \mathrm{ABS}\left(\sum_1^3 Q_n\right)$ initially

| n | Q | $R_n$ | $Q_n$ | $P_n$ | Q' | Q" | $T_n$ |
|---|------|---|-----|-----|------|------|------|
| 1 | 2000 | 1 | 500 | 550 | 550 | 500 | 500 |
| 2 | 1450 | 2 | 100 | 130 | 130 | 100 | 100 |
| 3 | 1320 | 4 | 500 | 700 | 700 | 500 | 500 |
| SUM | | | 1100 | | 1100 | 1100 | 1100 |

TABLE 2

$Q > 0$ initially; $\mathrm{ABS}(Q) < \mathrm{ABS}\left(\sum_1^3 Q_n\right)$ initially

| n | Q | $R_n$ | $Q_n$ | $P_n$ | Q' | Q" | $T_n$ |
|---|------|---|-----|-----|-----|-----|-----|
| 1 | 1000 | 1 | 500 | 550 | 550 | 500 | 500 |
| 2 | 450 | 2 | 100 | 130 | 130 | 100 | 100 |
| 3 | 320 | 4 | 500 | 700 | 320 | 320 | 229 |
| SUM | | | 1100 | | 1000 | 920 | 829 |

TABLE 3

$Q < 0$ initially; $\mathrm{ABS}(Q) > \mathrm{ABS}\left(\sum_1^3 Q_n\right)$ initially

| n | Q | $R_n$ | $Q_n$ | $P_n$ | Q' | Q" | $T_n$ |
|---|-------|---|------|------|------|------|------|
| 1 | −2000 | 1 | −500 | −550 | −550 | −500 | −500 |
| 2 | −1450 | 2 | −100 | −130 | −130 | −100 | −100 |
| 3 | −1320 | 4 | −500 | −700 | −700 | −500 | −500 |
| SUM | | | 11100 | | −1100 | −1100 | −1100 |

TABLE 4

$Q < 0$ initially; $\mathrm{ABS}(Q) < \mathrm{ABS}\left(\sum_1^3 Q_n\right)$ initially

| n | Q | $R_n$ | $Q_n$ | $P_n$ | Q' | Q" | $T_n$ |
|---|-------|---|------|------|------|------|------|
| 1 | −1000 | 1 | −500 | −550 | −550 | −500 | −500 |
| 2 | −450 | 2 | −100 | −130 | −130 | −100 | −100 |
| 3 | −320 | 4 | −500 | −700 | −320 | −320 | −229 |
| SUM | | | −1100 | | −1000 | −920 | −829 |

Figure 7:
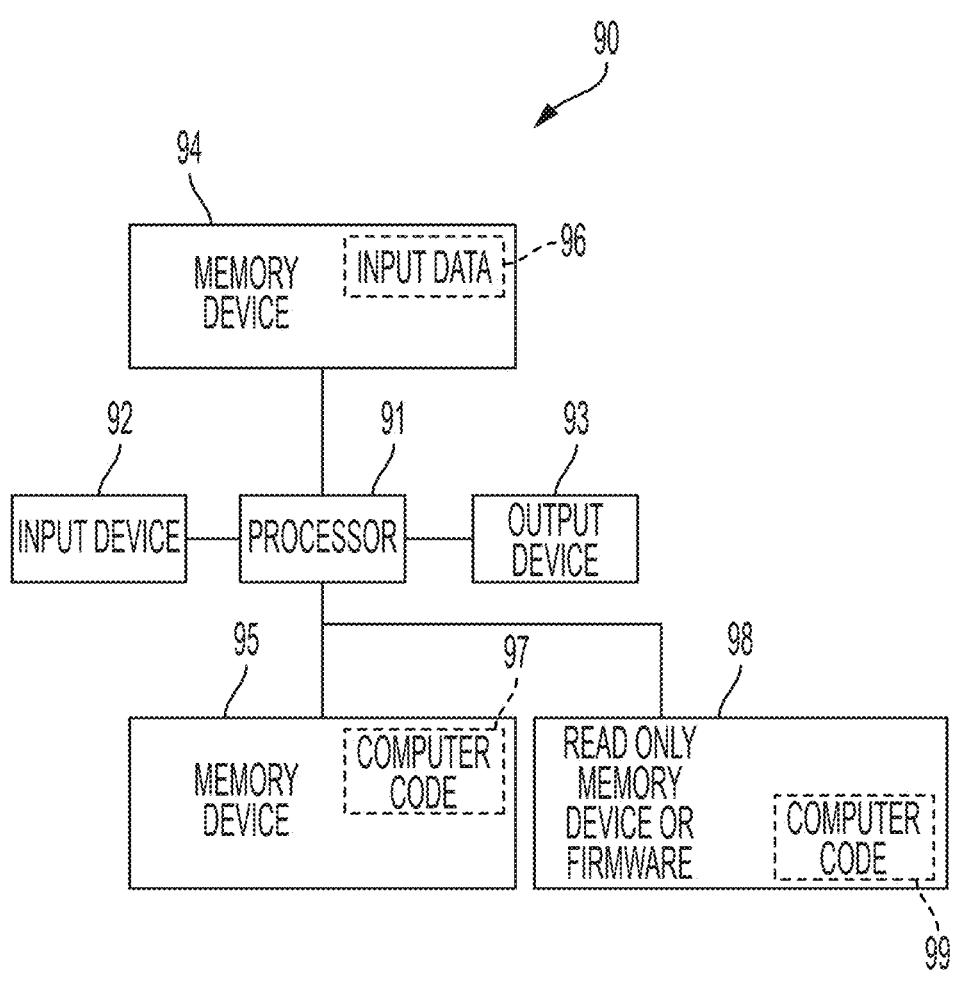
FIG. 7 illustrates a computer system, in accordance with embodiments of the present invention.

FIG. 7 illustrates a computer system 90, in accordance with embodiments of the present invention.

The computer system 90 includes a processor 91, an input device 92 coupled to the processor 91, an output device 93 coupled to the processor 91, and memory devices 94 and 95 each coupled to the processor 91. The processor 91 represents one or more processors and may denote a single processor or a plurality of processors. The input device 92 may be, inter alia, a keyboard, a mouse, a camera, a touchscreen, etc., or a combination thereof. The output device 93 may be, inter alia, a printer, a plotter, a computer screen, a magnetic tape, a removable hard disk, a floppy disk, etc., or a combination thereof. The memory devices 94 and 95 may each be, inter alia, a hard disk, a floppy disk, a magnetic tape, an optical storage such as a compact disc (CD) or a digital video disc (DVD), a dynamic random access memory (DRAM), a read-only memory (ROM), etc., or a combination thereof. The memory device 95 includes a computer code 97. The computer code 97 includes algorithms for executing embodiments of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 99 (e.g., including algorithms) may be stored on a static, nonremovable, read-only storage medium such as a Read-Only Memory (ROM) device 98, or may be accessed by processor 91 directly from such a static, nonremovable, read-only medium 98. Similarly, in some embodiments, stored computer program code 99 may be stored as computer-readable firmware, or may be accessed by processor 91 directly from such firmware, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with cross-referencing metrics associated with plug-in components, generating software code modules, and enabling operational functionality of target cloud components. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with cross-referencing metrics associated with plug-in components, generating software code modules, and enabling operational functionality of target cloud components. In another embodiment, the invention provides a business method that performs the process steps of the invention on a subscription, advertising, and/or fee basis. That is, a service supplier, such as a Solution Integrator, could offer to enable a process for improving software technology associated with cross-referencing metrics associated with plug-in components, generating software code modules, and enabling operational functionality of target cloud components. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 8:
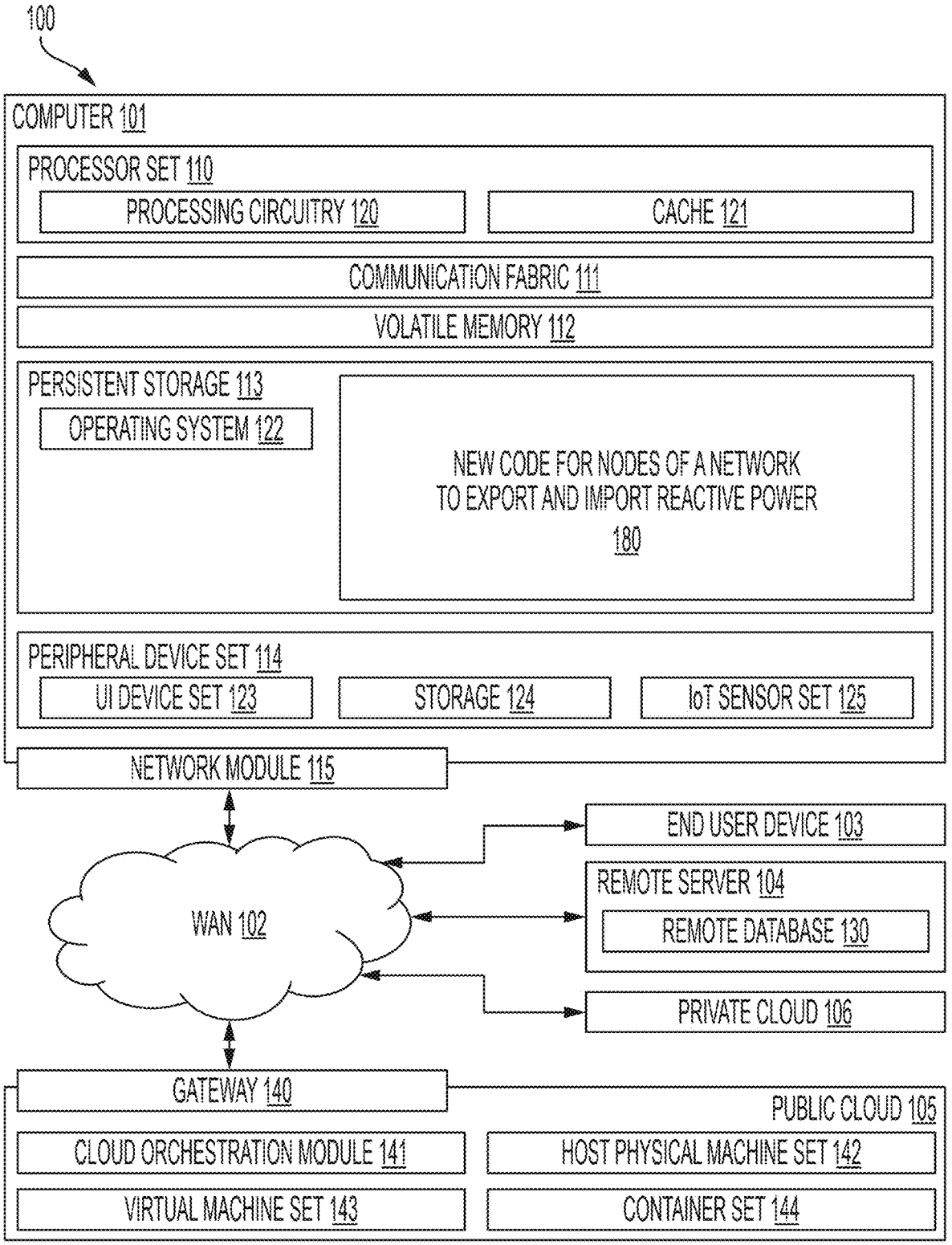
FIG. 8 depicts a computing environment which contains an example of an environment for the execution of at least some of the computer code involved in performing the inventive methods, in accordance with embodiments of the present invention.

FIG. 8 depicts a computing environment 100 which contains an example of an environment for the execution of at least some of the computer code involved in performing the inventive methods, in accordance with embodiments of the present invention. Such computer code includes new code for nodes of a network to export and import reactive power 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 8. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for a central controller of an electrical power distribution network to control an exporting and importing of reactive power by nodes of the network, the method comprising:

identifying, by the central controller, one node of the network having a capability of exporting Q units of reactive power to the network and N nodes of the network each having a capability of importing reactive power from the network, wherein the N nodes do not comprise the one node, wherein N is at least 2, and wherein initially Q>0 or Q<0;

sorting, by the central controller, the N nodes in an ascending order of relative distance from the one node, wherein the sorted N nodes, denoted as nodes 1, . . . , node N, have a capability of importing Q1, . . . , QN units of reactive power and are at a relative distance of R1, . . . , RN from the one node, respectively;

setting, by the central controller, a node index n to 0;

performing a loop over the sorted N nodes, a next iteration of the loop comprising:

incrementing, by the central controller, n by 1;

computing, by the central controller, Q' as a function of Q, Qn, and m(Rn), wherein Q' denotes an amount of reactive power to be exported to the network by the one node, and wherein m(Rn) is a reactive power scale factor that is a function of Rn;

sending, by the central controller, a first electromagnetic signal to the one node, wherein the first electromagnetic signal causes the one node to export the amount Q' of reactive power to the network;

computing, by the central controller, Q" as a function of Q' and Qn, wherein Q" denotes an amount of reactive power to be imported from the network by node n;

sending, by the central controller, a second electromagnetic signal to node n, wherein the second electromagnetic signal causes node n to import the amount Q" of reactive power from the network; and after the one node has exported the amount Q' of reactive power to the network in response to the first electromagnetic signal, computing, by the central controller, Q=Q−Q' followed by: if ABS(Q)=0 or n=N then exiting the loop, otherwise branching, by the central controller, to the incrementing n by 1 to perform a next iteration of the loop.

2. The method of claim 1, wherein computing Q' comprises:

computing Pn=Qn*(1+m(Rn)); and if ABS(Q)−ABS(Pn)>0 then computing Q'=Pn, otherwise computing Q'=Q.

3. The method of claim 1, wherein computing Q" comprises:

if ABS(Q')−ABS(Qn)>0 then computing Q"=Qn, otherwise computing Q"=Q.

4. The method of claim 1, wherein initially Q>0.

5. The method of claim 1, wherein initially Q<0.

6. The method of claim 1, wherein only one iteration of the loop is performed.

7. The method of claim 1, wherein at least two iterations of the loop are performed.

8. The method of claim 7, wherein only less than N−1 iterations of the loop are performed.

9. The method of claim 1, wherein N−1 iterations of the loop are performed.

10. The method of claim 1, further comprising:

if computing Q' comprises computing Q'=Q then computing, by the central controller, T=ABS(Q'/(1+t(Rn))), otherwise computing, by the central controller, T=Q, wherein t(Rn) is a token scale factor that is a function of Rn; and providing, by the central controller to node n, T tokens that can be subsequently exchanged with the network for real or reactive power.

11. A computer program product, comprising one or more computer readable hardware storage devices having computer readable program code stored therein, the program code containing instructions executable by one or more processors of a computer system to implement a method for a central controller of an electrical power distribution network to control an exporting and importing of reactive power by nodes of the network, the method comprising:

identifying, by the central controller, one node of the network having a capability of exporting Q units of reactive power to the network and N nodes of the network each having a capability of importing reactive power from the network, wherein the N nodes do not comprise the one node, wherein N is at least 2, and wherein initially Q>0 or Q<0;

sorting, by the central controller, the N nodes in an ascending order of relative distance from the one node, wherein the sorted N nodes, denoted as nodes 1, . . . , node N, have a capability of importing Q1, . . . , QN units of reactive power and are at a relative distance of R1, . . . , RN from the one node, respectively;

setting, by the central controller, a node index n to 0;

performing a loop over the sorted N nodes, a next iteration of the loop comprising:

incrementing, by the central controller, n by 1;

computing, by the central controller, Q' as a function of Q, Qn, and m(Rn), wherein Q' denotes an amount of reactive power to be exported to the network by the one node, and wherein m(Rn) is a reactive power scale factor that is a function of Rn;

sending, by the central controller, a first electromagnetic signal to the one node, wherein the first electromagnetic signal causes the one node to export the amount Q' of reactive power to the network;

computing, by the central controller, Q" as a function of Q' and Qn, wherein Q" denotes an amount of reactive power to be imported from the network by node n;

sending, by the central controller, a second electromagnetic signal to node n, wherein the second electromagnetic signal causes node n to import the amount Q" of reactive power from the network; and after the one node has exported the amount Q' of reactive power to the network in response to the first electromagnetic signal, computing, by the central controller, Q=Q−Q' followed by: if ABS(Q)=0 or n=N then exiting the loop, otherwise branching, by the central controller, to the incrementing n by 1 to perform a next iteration of the loop.

12. The computer program product of claim 11, wherein computing Q' comprises:

computing Pn=Qn*(1+m(Rn)); and if ABS(Q)−ABS(Pn)>0 then computing Q'=Pn, otherwise computing Q'=Q.

13. The computer program product of claim 11, wherein computing Q" comprises:

if ABS(Q')−ABS(Qn)>0 then computing Q"=Qn, otherwise computing Q"=Q.

14. The computer program product of claim 11, wherein initially Q>0.

15. The computer program product of claim 11, wherein initially Q<0.

16. A computer system, comprising one or more processors, one or more memories, and one or more computer readable hardware storage devices, the one or more hardware storage devices containing program code executable by the one or more processors via the one or more memories to implement a method for a central controller of an electrical power distribution network to control an exporting and importing of reactive power by nodes of the network, the method comprising:

identifying, by the central controller, one node of the network having a capability of exporting Q units of reactive power to the network and N nodes of the network each having a capability of importing reactive power from the network, wherein the N nodes do not comprise the one node, wherein N is at least 2, and wherein initially Q>0 or Q<0;

sorting, by the central controller, the N nodes in an ascending order of relative distance from the one node, wherein the sorted N nodes, denoted as nodes 1, . . . , node N, have a capability of importing Q1, . . . , QN units of reactive power and are at a relative distance of R1, . . . , RN from the one node, respectively;

setting, by the central controller, a node index n to 0;

performing a loop over the sorted N nodes, a next iteration of the loop comprising:

incrementing, by the central controller, n by 1;

computing, by the central controller, Q' as a function of Q, Qn, and m(Rn), wherein Q' denotes an amount of reactive power to be exported to the network by the one node, and wherein m(Rn) is a reactive power scale factor that is a function of Rn;

sending, by the central controller, a first electromagnetic signal to the one node, wherein the first electromagnetic signal causes the one node to export the amount Q' of reactive power to the network;

computing, by the central controller, Q" as a function of Q' and Qn, wherein Q" denotes an amount of reactive power to be imported from the network by node n;

sending, by the central controller, a second electromagnetic signal to node n, wherein the second electromagnetic signal causes node n to import the amount Q" of reactive power from the network; and after the one node has exported the amount Q' of reactive power to the network in response to the first electromagnetic signal, computing, by the central controller, Q=Q−Q' followed by: if ABS(Q)=0 or n=N then exiting the loop, otherwise branching, by the central controller, to the incrementing n by 1 to perform a next iteration of the loop.

17. The computer system of claim 16, wherein computing Q' comprises:

computing Pn=Qn*(1+m(Rn)); and if ABS(Q)−ABS(Pn)>0 then computing Q'=Pn, otherwise computing Q'=Q.

18. The computer system of claim 16, wherein computing Q" comprises:

if ABS(Q')−ABS(Qn)>0 then computing Q"=Qn, otherwise computing Q"=Q.

19. The computer system of claim 16, wherein initially Q>0.

20. The computer system of claim 16, wherein initially Q<0.

*     *     *     *     *